Patented Feb. 1, 1944

2,340,344

UNITED STATES PATENT OFFICE 2,340,344

PROCESS FOR FORMING UNSATURATED ALCOHOLS OR ESTERS

Albert S. Richardson, Wyoming, and James E. Taylor, Cincinnati, Ohio, assignors to The Procter and Gamble Company, Ivorydale, Ohio, a corporation of Ohio No Drawing. Application February 21, 1941, Serial No. 380,073

14 Claims. (Cl. 260—410.9)

Our invention relates to a process for forming unsaturated alcohols or unsaturated esters, or both, by reacting hydrogen with certain metallic salts of unsaturated carboxylic acids.

This process converts a salt of a carboxylic acid, which may be represented as $(R \cdot CO \cdot O)_x M$, where R is an organic radical containing at least one double carbon bond, M is a metallic radical of a group which will be defined, and $x$ is a small whole number, into the corresponding unsaturated alcohol which may be represented as $R \cdot CH_2 \cdot OH$. These reactants may react with another molecule of the salt or with the acid radical of this salt to form the corresponding ester, which may be represented as $R \cdot CO \cdot O \cdot CH_2 R$ The main object of our invention is to form unsaturated primary alcohol or their simple esters from unsaturated acids or from salts or esters of these acids.

Unsaturated mixtures of alcohols or esters, or both, suitable for use in the manufacture or synthesis of detergents, of emulsifying or wetting agents, of plasticizing agents, of waxes, of drying compositions, and the like, may be formed by our process from unsaturated mixtures of fatty acids derived from naturally occurring fatty oils or from rosin or from other sources. Primary aromatic alcohols and their esters may also be made by our process.

Raw materials for our process and uses for the alcohols and esters which may be made by our process are so numerous and varied that our invention will find application in the preparation of products other than those specifically mentioned herein.

In this specification the term "corresponding" is used to denote similarity of the R groups of an alcohol, $R \cdot CH_2 \cdot OH$, or of its esters, $R \cdot CO \cdot OCH_2 R$ and of the carboxylic acid, $R \cdot CO \cdot OH$, from which these are derived. The term "residue" is used to denote the

group of an acid, alcohol, or ester.

Previously described methods for making unsaturated alcohols or unsaturated esters which depend upon a hydrogenation step have given disappointing results. Our present process, which does not depend upon the employment of a catalyst, differs greatly from earlier methods and is well adapted to convert salts of unsaturated acids into unsaturated alcohols or esters with little or no simultaneous saturation of double carbon bonds. The ability of our method to accomplish this conversion rapidly is one of its principal advantages over prior methods. As a result of the relatively high reaction rate of our process under normally preferred conditions, it may be practiced on a commercial scale with equipment which is relatively small and inexpensive in proportion to its production capacity, with consequent economic advantages.

In a related copending application, Serial Number 380,072, filed concurrently herewith, we have described our recent discoverey that at relatively high temperature and pressure hydrogen readily reacts with carboxylates of certain metals, including those of lead and cadmium with formation of either an alcohol or an ester or a mixture of alcohol and ester. This process converts the carboxylic group, —CO—O—, of the acid radical into the group —CH₂—O—, which is present both in the alcohol and in the ester.

The invention to which the present application is more particularly directed is based on our discovery that unsaturated primary alcohols, or esters of these alcohols, are formed when salts whose acid radicals are carboxylic acids containing double carbon bonds, and whose basic radicals comprise certain metals, react with hydrogen at relatively high temperature and pressure.

When lead carboxylates are subjected to our process, relatively high yields of primary alcohols corresponding to the acid radicals of the carboxylate are obtained. Esters of these alcohols are also formed, usually in lesser amounts. Hydrogenation of double carbon bonds does not occur to a substantial extent when lead carboxylates are thus hydrogenated, and consequently unsaturated alcohols, and lesser amounts of unsaturated esters, may be produced from lead salts of unsaturated carboxylic acids.

When cadmium carboxylates are subjected to our process relatively high yields of esters are obtained, these esters having alcohol and acid residues corresponding to the acid radicals of the carboxylates. The reaction products may also include the corresponding alcohols, usually in relatively small amounts especially if carboxylates of other metals than cadmium are absent. Hydrogenation of double carbon bonds does not occur to a substantial extent when cadmium carboxylates are thus hydrogenated, and consequently unsaturated esters and lesser amounts of unsaturated alcohols may be produced from cadmium salts of unsaturated acids.

We have also found that when mixtures of carboxylates, the metallic constituent of which includes two or more metals, are subjected to our process, the percentage conversion of the —CO—O— group to the —CH$_2$—O— group is often higher than the conversion obtainable under comparable conditions with carboxylates of any one of the individual metals; furthermore, that the relative proportions of alcohols and esters produced, and the relative extent of concurrent saturation of unsaturated carbon bonds, are not readily predictable from a knowledge of the results obtained when carboxylates of the several metals of the mixture are hydrogenated individually. Mixtures of carboxylates of copper and cadmium, or cadmium and nickel, for example, give high yields of alcohols and relatively lower yields of esters, and if the carboxylates are unsaturated the resulting products tend to be unsaturated to approximately the same degree.

When carried out under the preferred conditions herein described, the alcohol residue and acid residue of the ester produced by the process are those which correspond to the carboxylic acid in number of carbon atoms and configuration of carbon chains and substituent groups. When the reaction mixture includes salts of more than one carboxylic acid mixed esters may result. It is our belief that the partial hydrogenation of the carboxylic group in the salt to form the corresponding alcohol is the primary reaction, and that the formation of ester is a subsequent and secondary reaction.

Under preferred conditions of our process the degree to which saturation with hydrogen of double carbon bonds occurs is relatively small, seldom exceeding about fifteen or twenty per cent as calculated from change in iodine value.

In preparing to carry out our process, we first obtain the salt of the unsaturated carboxylic acid and of the chosen metal in any convenient way. Metallic carboxylates may, for example, be formed in many cases by reacting the carboxylic acid with an oxide, hydroxide, carbonate, or other salt of the metal.

A salt forming procedure that is generally applicable for making water-insoluble salts is to mix two water solutions containing equivalent amounts, respectively, of the soluble sodium salt of the carboxylic acid (which may be made by reacting the carboxylic acid or a glyceride or other ester of this acid with an aqueous solution of NaOH) and of a water-soluble inorganic salt of the metal. A precipitate of the desired carboxylate is thus formed, which we then separate from the remaining solution and wash and dry, this salt in some cases being a basic rather than a normal salt.

Another method of making a metallic carboxylate that is especially convenient when the carboxylic acid is a fatty acid consists in saponifying a triglyceride or other ester with an oxide or hydroxide of a metal. Litharge, for example, may be agitated and heated with naturally occurring triglyceride by blowing a current of steam through this mixture, thus forming lead soaps of the fatty acids of the glycerides.

To carry out the essential step of our process, we place the metallic carboxylic salt in a suitable vessel, introduce hydrogen under superatmospheric pressure, elevate the temperature, and maintain intimate contact between hydrogen and the salt until the reaction has taken place.

Instead of employing a single salt of a carboxylic acid, a mixture of a number of salts may be employed, comprising a plurality of metals or a plurality of carboxylic acids or a plurality of both.

Preferred conditions for our process include the maintenance of a temperature between about 240° C. and about 400° C. and a pressure in excess of 2000 pounds per square inch. The alcohol and ester forming reactions occur, although more slowly, at temperatures below 240° C., down to 180° C. at least. Likewise these reactions have been observed under suitable temperature conditions at pressures as low as 500 pounds per square inch. The most favorable temperature and pressure conditions cannot be more definitely stated because they vary with different carboxylates. It is well known that carboxylates vary in their stability at elevated temperature, and it is of course preferable to choose a reaction temperature for each carboxylate such that side reactions due to pyrolysis are not excessive.

Usually, especially when the object is to form alcohols in preference to esters, gaseous hydrogen is supplied to the organic salt undergoing reaction not only in amount adequate for the reaction, which is 5 mols of hydrogen per 2 mols of carboxylic group for alcohol formation, or 3 mols of hydrogen per 2 mols of carboxylic group for ester formation, but also in sufficient excess so that throughout the reaction there will be a relative preponderance of unreacted hydrogen as compared with water vapor.

When the object is to form esters in preference to alcohols it is sometimes expedient to hydrogenate a mixture consisting of a metallic carboxylic salt and the corresponding free carboxylic acid, this mixture containing relatively more mols of salt than of free acid, instead of hydrogenating the salt alone.

Intimate contact between the hydrogen and the reacting salts, which usually are molten at the temperature of reaction, is preferably provided by some form of agitation, although the reaction will proceed somewhat more slowly in the absence of agitation. The time required for the reaction is usually relatively short. In many cases when temperature and pressure are within the preferred ranges approximate equilibrium is reached within two or three hours, and sometimes the reaction goes substantially to completion within as short a time as five minutes after reaching the preferred temperature. Continuation of the elevated reaction temperature and pressure and continued contact with hydrogen for several hours after completion of the alcohol and ester forming reactions have not been found to influence the yields of the desired products to any appreciable extent.

After the reaction is sufficiently complete, as judged by removing and analyzing a sample or by previous experience or by other convenient method, the usual procedure is to cool the reaction mixture to a temperature such that the products will not be injured by contact with air, and to release excess vapor pressure. The non-gaseous organic reaction mixture may be decanted or filtered from such elementary metal as may be present.

The reaction products may be employed for some of their intended uses without purification. They may, on the other hand, be subjected to any desired degree of purification depending on the requirements of their subsequent use. Several optional purification treatments are mentioned herein, and others appropriate to individual cases will readily occur to those skilled in the art.

When the reaction products are water-insoluble they may be washed with dilute hydrochloric or sulphuric or other suitable mineral acid under such conditions as will remove any remaining metal, which may be present in elementary form, or as oxide, hydroxide, or organic salt. The remaining products are usually then water washed to free them of mineral acid, and they then may be filtered and dried. Distillation may be employed in addition to or as a substitute for acid washing as an optional purification step in some cases.

If a product consisting of an alcohol or mixture of alcohols substantially free from other substances is desired any one of several procedures may be followed, usually after the hydrogenation reaction products have been acid washed or otherwise separated from metals. Free carboxylic acids may be neutralized with sodium hydroxide solution. Esters present among the reaction products may be hydrolized or saponified by any convenient method to form the respective alcohols and either the carboxylic acids or salts of these acids. Alcohols and associated organic fluids may, if water-insoluble, be separated from solid and aqueous phases by settling or solvent extraction or steam distillation or other appropriate method. Fractional distillation may be employed to separate water-soluble alcohols.

Esters and fatty acids present among the reaction products may be reacted with an oxide or hydroxide of lead or with a suitable mixture of metallic oxides or hydroxides, to form metallic carboxylates which may be re-subjected to our hydrogenation process to produce additional unsaturated alcohol.

If, on the other hand, a product consisting of an ester or mixture of esters substantially free from other substances is desired a different purification procedure is employed. In this case the reaction products, usually after acid washing, water washing, and drying, may be analyzed to determine the amounts of free carboxylic acid and free alcohol contained therein, additional alcohol or carboxylic acid may then be added so that the total amounts of free acid and free alcohol then present in the mixture are in chemically equivalent proportions, and this mixture may then be heated under suitable conditions to esterify the acid and alcohol components. If desired, an excess of free carboxylic acid or free alcohol may be employed in the esterification step, and the excess acid or alcohol remaining may then be removed in any appropriate manner.

The following examples will provide a more detailed understanding of our process. In each of these examples the reaction was carried out in a reaction vessel consisting of a stainless steel bomb of 300 cubic centimeters capacity. The mixed fatty acids present in commercial oleic acid, or "red oil," are for convenience referred to as oleic acid, and similar terminology is employed in speaking of the corresponding alcohols and esters.

In each of the examples dealing with fatty materials the approximate composition of the washed mixture of reaction products was calculated from the fat characteristics of this mixture, or of one of its principal components, and from the corresponding characteristics of the original mixture of fatty acids from which the soaps employed in the example were prepared.

*Example 1.*—Equivalent amounts of lead nitrate and sodium soap of commercial oleic acid, each in water solution, were brought together and the resulting insoluble lead soap was water washed and dried. 100 grams of this soap were placed in the bomb at room temperature, air was displaced from this vessel by admitting hydrogen and venting the bomb, and then hydrogen was introduced to build up the pressure in the bomb to 2000 pounds per square inch. The bomb was sealed and heated to about 340° C. The contents were agitated by rocking the bomb, while maintaining a pressure of 4000 pounds pressure by adding more hydrogen when necessary, for 3 hours. The bomb was then allowed to cool to a temperature convenient for handling, excess gas pressure was released, and the non-gaseous organic contents were removed, boiled with a 10% aqueous solution of hydrochloric acid, and water washed until free from mineral acid, filtered to remove moisture, and analyzed.

This product was found to contain less than 1% of oleic acid, about 21% of oleyl oleate and about 77% of oleyl alcohol. The product had an iodine value of 81, which indicated that about 85% of the olefin double bonds escaped saturation.

The presence of the alcohol (including both the free alcohol and that combined as ester) was confirmed by extracting it by means of a volatile organic solvent from the reaction products after same had been acid washed and saponified with caustic potash, removing the solvent by evaporation, and determining the analytical characteristics, which agreed closely with the expected values for oleyl alcohol.

*Example 2.*—A mixture of 50 gms. of zinc oleate and 50 gms. of chromium oleate, prepared by treating "red oil" sodium soaps with zinc nitrate and with chromium sulphate respectively, according to the procedure described in Example 1, was subjected to hydrogenation under conditions identical to those of Example 1 except that the reaction pressure was 3500 pounds per square inch.

The resulting washed product, when completely saponified with an alcoholic potash solution and extracted with petroleum ether, yielded about 39% of unsaponifiable matter. This was found to contain 91% of alcohols corresponding to the red oil fatty acids: hence the unsaponified product contained about 91% of 39%, or 35% of free and combined alcohol. The unsaponifiable matter had an iodine value of 64, indicating that about 68% of the double bonds of its components escaped saturation.

When hydrogenated alone under similar conditions 100 gms. of zinc oleate yielded only 2% of free and combined alcohol in the unsaponified product, and 100 gms. of chromium oleate yielded only 27% of free and combined alcohol, as compared with 35% yielded by the mixture of these two soaps in the above example.

*Example 3.*—In a hydrogenation similar to that of Example 2, except that the reaction pressure was 3600 pounds per square inch, a mixture of 50 gms. of cadmium oleate and 50 gms. of chromium oleate yielded a washed product containing about 90% of free and combined oleyl alcohol having an iodine value of about 90.

When hydrogenated separately under similar conditions 100 gms. of cadmium oleate yielded only 41% of free and combined alcohol in the reaction product, and 100 gms. of chromium oleate yielded only 27%.

*Example 4.*—Cadmium oleate prepared by treating "red oil" sodium soaps with cadmium nitrate according to the procedure described in Example 1, was subjected to hydrogenation under conditions identical to those of Example 1 except that the reaction pressure was 3000 pounds per square inch.

The resulting acid washed and water washed product contained about 19% of free oleic acid, about 74% of oleyl oleate, and about 6% of oleyl alcohol. The unsaponifiable matter had an iodine value of 92, indicating less than 5% hydrogenation of double bonds in the free and combined alcohols.

*Example 5.*—100 grams of lead benzoate were hydrogenated under conditions identical with those of Example 1, except that the time at the reaction temperature and pressure was only one hour.

The non-gaseous products consisted of metallic lead and a two phase liquid, one phase of which contained about 70% benzyl alcohol.

*Example 6.*—100 grams of lead salts of castor oil mixed fatty acids (including a predominant proportion of ricinoleic acid) were hydrogenated by agitating these salts in the presence of hydrogen, while heating the reaction vessel from room temperature to 340° C. during the course of 100 minutes. During this time the pressure rose from an initial hydrogen pressure of 2000 pounds per square inch to 2500 pounds per square inch.

The non-gaseous products were acidulated and water washed. The resulting product had a saponification value of 45.9, indicating that the carboxylic groups of approximately 76% of the fatty acid radicals had been hydrogenated. The product upon saponification with potassium hydroxide and extraction with petroleum ether yielded an unsaponifiable portion that had a hydroxyl value of 315 and an iodine value of 79.5. These values, together with the known approximate composition and characteristics of the castor oil fatty acids, indicated the presence of about 57% of dihydroxy alcohol having a chain of 18 carbons and about 43% of the corresponding monohydroxy alcohol, and indicated that about 88% of these alcohols contained one olefin double bond and that the remainder were saturated alcohols.

*Example 7.*—A mixture of 90 gms. of cadmium oleate and 10 gms. of nickel oleate was subjected to hydrogenation under conditions similar to those of Example 1 except that the time at the elevated reaction temperature and pressure was only one hour.

The resulting acid washed and water washed product contained less than 1% of free oleic acid, about 80% of free oleyl alcohol, and about 5% of oleyl alcohol combined as ester. The iodine value of the product was 75, indicating that about 79% of the double carbon bonds remained unsaturated.

When nickel oleate alone was hydrogenated under similar conditions no significant amount of free or combined alcohol was formed.

Our process is capable of application to many varied raw materials to produce many useful products. Unsaturated fatty alcohols, which may be sulphated or sulphonated for use in detergents or wetting agents or emulsifying agents, may for example be made from unsaturated fatty oils or their fatty acids.

This process may also be employed to form an unsaturated mixture of alcohols or esters or both from rosin acids, or from mixtures of rosin acids and fatty acids. These products, and also unsaturated alcohols and unsaturated esters made by our process from fatty acids derived from drying oils, may be used in the preparation of improved drying compositions for use in paint, varnish, and related products.

Another use for this process is in the manufacture of synthetic waxes, composed principally or entirely of esters of fatty acids and high molecular weight alcohols. Convenient raw materials for use in making synthetic waxes are fatty acids derived from glyceride oils and rosin acids.

Having thus described our invention, what we claim and desire to secure by Letters Patent is:

1. The process which comprises subjecting to reaction with hydrogen, without added catalyst, a salt of an unsaturated carboxylic acid and of a metal selected from the group consisting of lead and cadmium, the reaction temperature and hydrogen pressure being sufficiently above atmospheric to effect substantial reduction of the carboxylic group, —CO—O—, of said salt to the group, —$CH_2$—O—, with resulting formation of a reaction product of the class consisting of unsaturated primary alcohol and ester thereof.

2. In the process of forming unsaturated reaction products the step which consists essentially in subjecting metallic salts of unsaturated carboxylic acids to contact with hydrogen at a temperature between about 300° C. and about 400° C. and under a pressure between about 3000 and about 4000 pounds per square inch, the metal of said salts being selected from the group consisting of lead and cadmium.

3. The process of forming reaction products of the group consisting of unsaturated primary fatty alcohols and unsaturated esters of said alcohols which comprises reacting hydrogen, under elevated temperature and pressure and without added catalyst, with molten soaps of corresponding unsaturated fatty acids derived from natural animal and vegetable sources, the metals of said soaps including a substantial proportion of a metal selected from the group consisting of lead and cadmium.

4. The process of forming reaction products of the group consisting of a primary alcohol of the series $C_nH_{(2n-x)}CH_2OH$ and the corresponding ester of the series $C_nH_{(2n-x)}COOCH_2C_nH_{(2n-x)}$ which comprises reacting hydrogen without added catalyst, with a metallic salt of the corresponding carboxylic acid of the series $C_nH_{(2n-x)}COOH$, where $x$ is one of the numbers 1, 3, 5, and 7, at a temperature between about 240° and about 400° C. and at a pressure above 2000 pounds per square inch, the metal of said salt being selected from the group consisting of lead and cadmium.

5. The process of forming reaction products of the group consisting of an unsaturated dihydroxy fatty alcohol, one hydroxyl group of which is linked to a primary carbon atom, and unsaturated ester of this alcohol which comprises reacting hydrogen, without added catalyst, with a metallic salt of the corresponding unsaturated hydroxy fatty acid at a temperature between about 240° and about 400° C. and at a pressure above 2000 pounds per square inch, the metal of said salt being selected from the group consisting of lead and cadmium.

6. The process of forming benzyl alcohol which comprises reacting hydrogen with a metallic benzoate at a temperature between about 240° and about 400° C. and at a pressure above 2000 pounds per square inch, the metal of said benzoate being selected from the group consisting of lead and cadmium.

7. The process of producing an unsaturated ester which comprises reacting hydrogen, at a temperature between about 240° and about 400° C. and at a pressure above 2000 pounds per square inch, with a mixture of an unsaturated carboxylic acid and a metallic salt of said acid, the metallic constituent of said salts comprising a substantial proportion of a metal selected from the group consisting of lead and cadmium, and said mixture containing relatively more mols of said salt than of said acid.

8. The process of forming unsaturated reaction products of the group consisting of primary alcohol and ester of said alcohol which comprises reacting hydrogen at elevated temperature and pressure with a lead salt of the unsaturated carboxylic acid corresponding to said alcohol.

9. The process of forming unsaturated reaction products of the group consisting of primary fatty alcohol and ester of said alcohol which comprises reacting hydrogen at elevated temperature and pressure with a lead soap of the unsaturated fatty acid corresponding to said alcohol.

10. The process of producing an unsaturated mixture of fatty alcohols which comprises: reacting an unsaturated fatty oil with litharge and steam to form a mixture of the corresponding lead soaps; and reacting said mixture of lead soaps with hydrogen at elevated temperature and pressure.

11. The process which consists essentially in reacting hydrogen with unsaturated cadmium carboxylates at elevated temperature and pressure, whereby the unsaturated esters whose acid and alcohol residues correspond to the unsaturated acid radicals of said carboxylates are formed.

12. The process which consists essentially in reacting hydrogen with unsaturated cadmium soaps at elevated temperature and pressure, whereby the unsaturated fatty esters whose acid and alcohol residues correspond to the unsaturated acid radicals of said soaps are formed.

13. The process of forming reaction products of the class consisting of unsaturated primary alcohol and ester thereof which comprises the steps of: reacting the unsaturated carboxylic acid corresponding to said alcohol with a basic reacting compound of a metal selected from the group composed of lead and cadmium, thereby forming the corresponding metallic carboxylate; and reacting said carboxylate with hydrogen at elevated temperature and pressure, and without added catalyst.

14. The process which comprises subjecting to reaction with hydrogen, without added catalyst, a salt of an aromatic carboxylic acid and of a metal selected from the group consisting of lead and cadmium, the reaction temperature and hydrogen pressure being sufficiently above atmospheric to effect substantial reduction of the carboxylic group, —CO—O—, of said salt to the group, —CH$_2$—O—, with resulting formation of a reaction product of the class consisting of unsaturated primary alcohol and ester thereof.

ALBERT S. RICHARDSON.
JAMES E. TAYLOR.